(12) United States Patent
Kawazoe et al.

(10) Patent No.: US 7,855,467 B2
(45) Date of Patent: Dec. 21, 2010

(54) HYBRID POWER GENERATION OF WIND-POWER GENERATOR AND BATTERY ENERGY STORAGE SYSTEM

(75) Inventors: Hironari Kawazoe, Hitachi (JP); Motoo Futami, Hitachiota (JP); Youji Ikeda, Ichikawa (JP); Yoshiaki Sato, Narshino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 505 days.

(21) Appl. No.: 12/015,609

(22) Filed: Jan. 17, 2008

(65) Prior Publication Data

US 2008/0179887 A1   Jul. 31, 2008

(30) Foreign Application Priority Data

Jan. 26, 2007   (JP) ............................. 2007-015738

(51) Int. Cl.
F03D 9/02   (2006.01)
(52) U.S. Cl. ......................................... 290/44
(58) Field of Classification Search ................... 290/44
See application file for complete search history.

(56) References Cited

U.S. PATENT DOCUMENTS

| 4,095,120 A | * | 6/1978 | Moran et al. | 290/44 |
| 4,228,362 A | * | 10/1980 | Jacobs et al. | 290/44 |
| 4,418,287 A | * | 11/1983 | Syverson | 290/44 |
| 4,535,252 A | * | 8/1985 | Jacobs et al. | 290/44 |
| 6,747,370 B2 | * | 6/2004 | Abe | 307/66 |
| 6,858,953 B2 | * | 2/2005 | Stahlkopf | 290/44 |
| 2007/0080666 A1 | * | 4/2007 | Ritter et al. | 320/128 |
| 2007/0246943 A1 | * | 10/2007 | Chang et al. | 290/44 |

FOREIGN PATENT DOCUMENTS

| JP | 09324740 A | * | 12/1997 |
| JP | 11-50945 |   | 2/1999 |
| JP | 11-299106 |   | 10/1999 |
| JP | 00-73932 |   | 3/2000 |
| JP | 2000073933 A | * | 3/2000 |
| JP | 2000308370 A | * | 11/2000 |
| JP | 2001-157364 |   | 6/2001 |
| JP | 2001-327080 |   | 11/2001 |
| JP | 2002-171669 |   | 6/2002 |
| JP | 2004064806 A | * | 2/2004 |
| JP | 2005130651 A | * | 5/2005 |
| JP | 2005130652 A | * | 5/2005 |
| JP | 2005-269859 |   | 9/2005 |
| JP | 2006-141093 |   | 6/2006 |
| JP | 2006-287998 |   | 10/2006 |

* cited by examiner

*Primary Examiner*—Joseph Waks
(74) *Attorney, Agent, or Firm*—Antonelli, Terry, Stout & Kraus, LLP.

(57) ABSTRACT

A hybrid system using a wind-power generator and a battery energy storage system includes a unit to set a system constant output value, a unit to control power generated from the wind-power generator, a unit to gradually change an output target value between an output constant operation and a regulation control operation, and a control unit to secure a charged ampere-hour of a battery in the output constant operation.

16 Claims, 6 Drawing Sheets

HYBRID POWER GENERATION OF WIND-POWER GENERATOR AND BATTERY ENERGY STORAGE SYSTEM

BACKGROUND OF THE INVENTION

The present invention relates to a hybrid system and a power control unit capable of producing constant power using a wind-power generator and a battery energy storage system.

Recently, it has been urged to introduce power generators employing natural energy such as a wind-power generator and a photovoltaic power generator. However, output power from these generators varies depending on natural conditions. There hence exists a fear that in association with increase in the power produced by the generators using natural energy, power systems receiving the power are adversely influenced as a result. For example, there may occur a frequency variation and a voltage variation. To cope with the difficulty, there has been proposed a method in which a battery energy storage system is installed for use with a natural-energy power generator to thereby suppress or to control the variation in output power of the generator.

The hybrid system using wind power or energy and a battery includes a wind-power generator to produce output power variable according to a change in the wind speed and a battery energy storage system to control variation in the output power of the generator. The hybrid system supplies the output power thus controlled to power systems.

JP-A-2001-327080 describes a method in which an output target value is set according to a charge capacity of a battery. JP-A-2006-141093 describes a method in which in order to set charge capacity of a battery to a target value, a charge-discharge command value of a battery energy storage system is changed according to the charge capacity, the charge-discharge command value being obtainable using the difference between an output value and an average value of a wind-power generator.

SUMMARY OF THE INVENTION

Particularly, for example, during an operation with a low load in the nighttime, the frequency variation is quite sensitive in the power system. Therefore, the variation in the output power to the power system highly likely exerts adverse influence upon the power system. It is hence required in the operation to supply constant output power to the power system.

However, according to the conventional hybrid system including a wind-power generator and a battery energy storage system, even if it is desired to supply constant power to the power system as above, the system output power cannot be necessarily kept fixed depending on an energized state of a battery and/or a state of the output power from the wind-power generator of which the output power varies according to a change in the wind speed.

It is therefore an object of the present invention to provide a hybrid system, a wind-power generator system, and a control unit in which substantially constant power can be delivered to a power system for a predetermined period of time by use of a wind-power generator and a battery energy storage system.

According to the present invention, the object can be achieved using measures as follows.

There is provided according to the present invention a power-energy generator system having a control mode in which a target value of power to be supplied to the power system is kept set to a fixed value for a predetermined period of time. The fixed value is other than an accurately fixed value and is a value with a slight variation, for example, a value of power allowing several percent of variation. The fixed value is set in association with the charge capacity of the battery energy storage system and the predetermined period of time.

According to the present invention, there is provided a hybrid system including a wind-power generator and a battery energy storage system including an output suppressing or control unit having a control mode in which power to be supplied to the power system is kept set to a fixed value. The fixed value is set according to the charged ampere-hour of the battery energy storage system and the predetermined period of time. In the control mode, an empty charge capacity and a portion of power exceeding the maximum charge capacity per unitary time of the battery energy storage system is controlled on the basis of a change relative to the fixed value in the output power from the wind-power power generator.

There is provided according to the present invention a power control unit which controls output power to the power system and which has a control mode in which a target value of power to be supplied to the power system is kept set to a fixed value for a predetermined period of time. The fixed value is set according to the charged ampere-hour of the battery energy storage system and the predetermined period of time.

In the hybrid system using wind power and a battery according to the present invention, the power supplied to the power system can be kept set to substantially a fixed value for a predetermined period of time by use of the measures described above. Therefore, also in a time zone in which the frequency variation is highly sensitive in the power system, it is not likely to adversely affect the power system.

Other objects, features and advantages of the invention will become apparent from the following description of the embodiments of the invention taken in conjunction with the accompanying drawings.

DESCRIPTION OF THE EMBODIMENTS

First Embodiment

Referring to the drawings, description will be given of an embodiment of the present invention.

Figure 1:
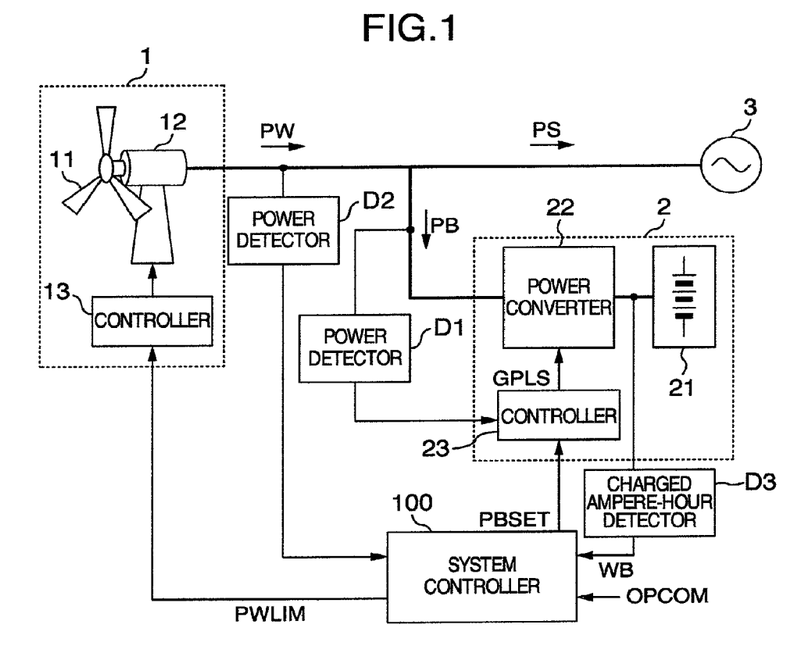
FIG. 1 is a block diagram showing a configuration of a hybrid system using wind power and a battery.

FIG. 1 shows structure of a hybrid system including a wind-power generator and a battery energy storage system under consideration. The system includes a wind-power generator 1 and a battery energy storage system or battery system 2 which are connected to a power system 3. A system control unit or controller 100 supervises the generator 1 and the battery system 2 to set system power PS to a predetermined value.

The generator 1 includes a windmill 11 to convert wind energy into rotation energy, a generator 12 to convert the rotation energy into electric energy, and a controller 13. The generator 12 may be a generator of induction type, synchronous type, or permanent magnetic type. The generator 12 may be operated in a variable-speed driving mode by use of a power converter. The controller 13 has a function to control power PW from the generator 1 according to an output limitation value PWLIM. The controller 13 controls a blade pitch angle of the windmill 11 or controls the power converter. Or, the controller 13 controls the power from the generator 1 according to a combination thereof.

The battery system 2 includes a battery 21, a power converter 22, and a controller 23. The battery 21 includes a battery element capable of charging and discharging direct-current (DC) power of, for example, a lead battery, a lithium-ion battery, an electric double layer condenser, or a redox flow cell. The controller 23 receives an output PB via a power detector D1 to control the power converter 22 by use of a gate pulse GPLS to set the output PB to a power command value PBSET. It is assumed that the output PB is positive in a charging direction and is negative in a discharging direction.

The system controller 100 receives the output PW from the generator 1 and a charged ampere-hour WB respectively via a power detector D2 and a charged ampere-hour detection circuit D3 according to an operation command OPCOM sent from a higher-class generation command station or the like. Then, the controller 100 outputs a power command value PBSET of the battery system 2 and a power limitation value PWLIM.

Figure 2:
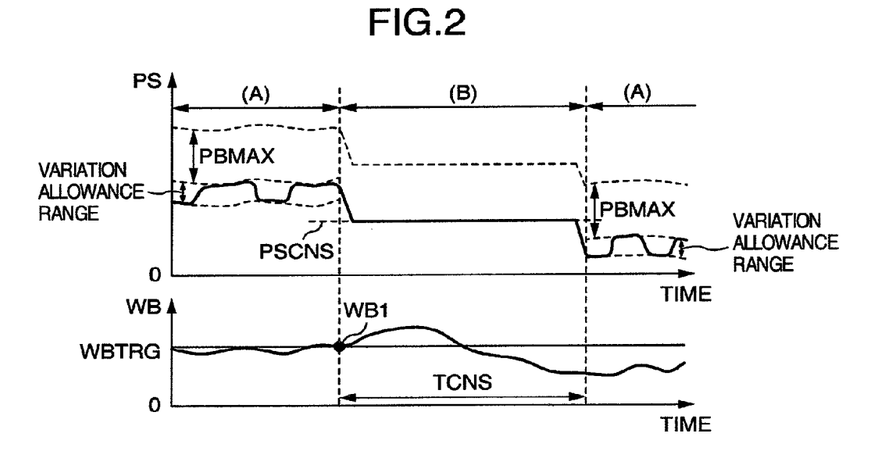
FIG. 2 is a graph to explain a method of operating the hybrid system.

Referring next to FIG. 2, description will be given of a operation method of the hybrid system which uses wind energy and a battery. In an upper graph, the ordinate represents the system power PS, the abscissa represents time, and a solid line indicates a change in time of the system power PS. In a lower graph, the ordinate represents the charged ampere-hour WB of the battery system 2, the abscissa represents time, and a solid line indicates a change in time of the charged ampere-hour WB.

In FIG. 2, a section indicated as (A) is a period of time in which the system is operated such that the system power PS varies within a predetermined range, namely, the system is in the regulation control operation. During the regulation control operation, the system operation is controlled, for example, as follows. The battery system 2 suppresses the change in the power PW from the generator 1 such that each absolute value of the maximum and minimum values of the allowable variation range of the system power PS is equal to or less than 10% of the rated value of the wind-power generator. Also, the system controller 100 controls the battery system 2 to set the charged ampere-hour WB to a charge target value WBTRG. In a situation wherein overcharge of the battery 21 is feared due to an abrupt increase in the wind speed or wherein the change in the power generated by wind exceeds a maximum output value PBMAX (indicating a maximum discharge capacity and a maximum charge capacity per unitary time) of the battery energy storage system, the power PW of the wind-power generator 1 is limited according to the output limitation value PWLIM. By arranging the function to limit the power produced from the generator 1 as above, the power system is supplied with stable power even at occurrence of a power variation exceeding the variation or regulation control capacity of the battery energy storage system 2.

Part (B) of FIG. 2 shows an operation period of time in which the system output PS is kept set to a constant output value PSCNS, namely, the period of time for the output constant operation. In this operation mode, the system controller 100 supervises the battery energy storage system 2 such that the difference between the constant output value PSCNS and a one-minute average value of the system output PS is equal to or less than 2 percent of the rated value of the wind-power generator. The constant output value PSCN is set, according to, for example, a charged ampere-hour WB1 of the battery system 2 and a period of output constant time TCNS at transition to the output constant operation, to a value in a range in which the battery system 21 is in a sufficiently energized state even if only the battery system 2 conducts a constant output operation when the output PW of the generator 1 is zero in the output constant operation. By setting the constant value of the power in this way, even if the windmill stops, the battery system 2 can supply by itself the power set as above, to thereby avoid a disadvantageous state of insufficient power.

In the operation, as in the regulation control operation, if there exists a fear of overcharge of the battery 21 due to an abrupt increase in the wind speed or a fear of a change in the power generated by wind energy exceeding the maximum output value PBMAX of the battery energy storage system 2, the power PW of the wind-power generator 1 is limited according to the output limitation value PWLIM.

As above, the target value of the constant output operation is set to a value less than the maximum discharge capacity per unitary time of the battery system, the value being in a range in which the battery system 21 is in a sufficiently energized state even if only the battery system 2 conducts a constant output operation when the output PW of the generator 1 is zero in the output constant operation. Additionally, in a situation wherein during the constant output operation, overcharge of the battery 21 is feared or the change in the power generated by wind energy exceeds the maximum output value PBMAX per unitary time of the battery energy storage system 2, the power PW of the wind-power generator 1 is limited. As a result, even if the power produced from the generator is insufficient or excessive or is varied with respect to the output target value for the power system, the output to the power system can be kept unchanged. This improves reliability of the constant output operation.

In the transition from the regulation control operation to the output control operation and vice versa, the system output PS is gradually changed to suppress adverse influences upon the power system, for example, the frequency variation in the power system.

Figure 3:
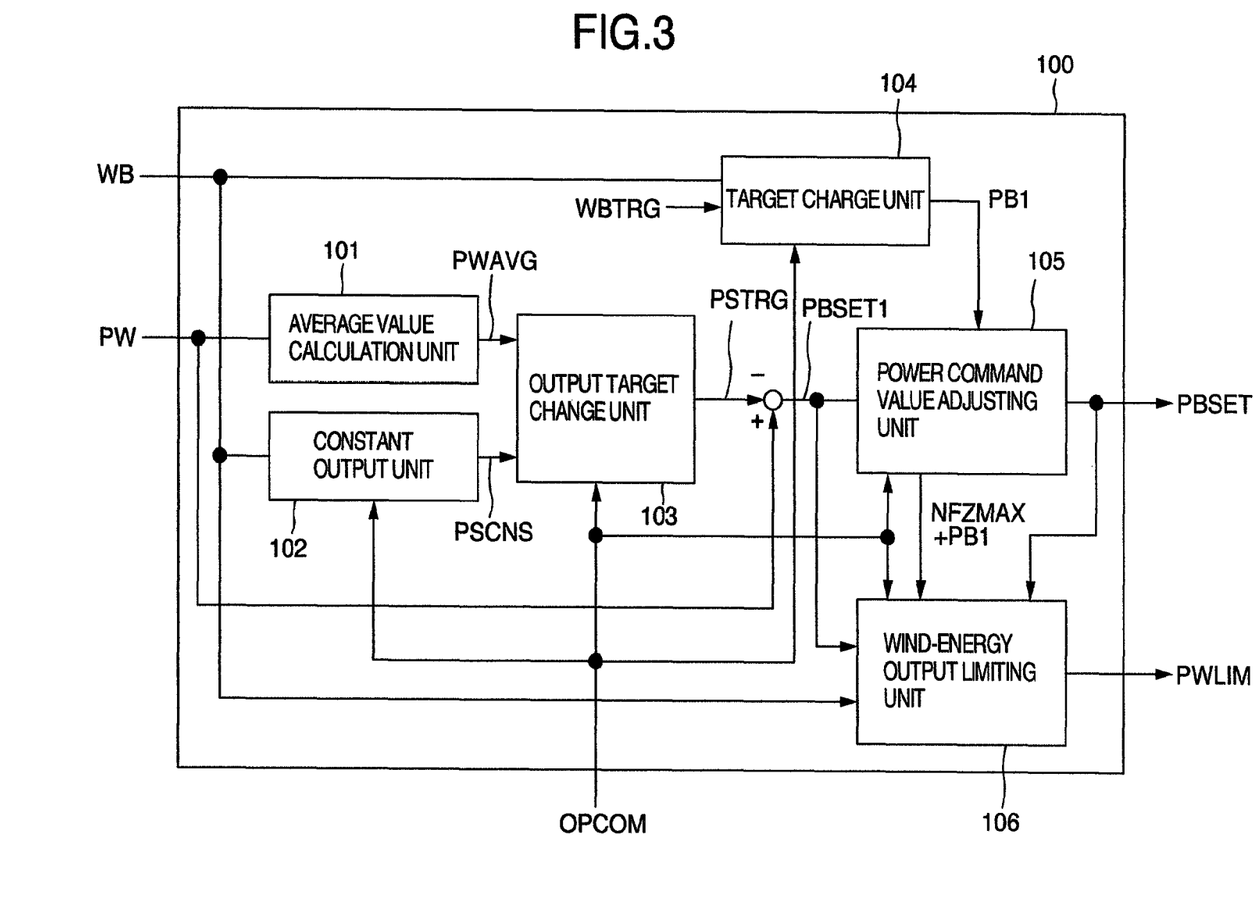
FIG. 3 is a block diagram showing a system controller.

FIG. 3 shows a configuration of the system controller 100 to achieve the operation method.

An average calculation unit 101 is a block to obtain an average value PWAVG of the output PW from the wind-power generator 1 and includes a moving average calculating module and a delay filter for time lag of first order.

A constant output unit 102 receives a charged ampere-hour WB of a battery 21 and an operation command OPCOM sent from a higher-level generation command station or the like to obtain a constant output value PSCNS using expression (1). In the expression, WB1 is a charged ampere-hour of the battery 21 at transition to the output constant operation, TCNS is a constant output time attained from the operation command OPCOM, and K is a correction coefficient representing, for example, a capacity conversion coefficient of the battery and a discharge loss of the battery energy storage system. If the change in the power generated by the wind-power generator exceeds the maximum output value PBMAX of the battery energy storage system, the system output PS cannot be kept retained to a fixed value. Therefore, the constant output value PSCNS is set to a value equal to or less than the maximum output value PBMAX of the battery system 2.

$$PSCNS = (WB1/TCNS) \times V \times K \qquad (1)$$

An output target change unit 103 determines the operation mode from the operation command OPCOM to change a system output command value PSTRG from the average value PWAVG to the constant output value PSCNS and vice versa. It is assumed that the rated output value of the wind-power generator is represented as, for example, 100%. The output target value is changed such that the system output is within the predetermined range of about 2% of the rated output value per minute and the rate of the power change is equal to or less than a fixed value. By changing the output target value in this fashion, it is possible to suppress possible adverse influences upon the power system.

A target charge unit 104 operates only in the regulation control operation. To secure the charged ampere-hour of the battery required for the output constant operation, the target charge unit 104 supplies a charge target command value PB1 to the power command adjusting unit 105 to set the charged ampere-hour WB to the charge target value WBTRG. By securing the battery charged ampere-hour, the power can be stably supplied in the output constant operation.

Assuming that the full charged ampere-hour of the battery 21 is represented as 100% and the available value ranges from 30% to 90% of the full charged ampere-hour in operation, the charge target value WBTRG is set to a value ranging from, for example, 60% to 90% of the full charged ampere-hour. The charge target command value PB1 is set as follows. In order that the operation does not cause a disadvantage that the system output PS during the regulation control operation described in conjunction with FIG. 2 is beyond the variation control range, the system output PS is gradually changed in a period of time ranging from several seconds to several tens of seconds. Moreover, the upper and lower limit values are specified by limiters. These values are represented as, for example, ±10% of the rated output value of the wind-power generator.

The power command value adjusting unit 105 adjusts a wind-power command value PBSET1 of the battery energy storage system 2 obtained from the difference between the output PW of the wind-power generator 1 and the system output command value PSTRG on the basis of the operation mode of the operation command OPCOM and the charge target command value PB1 of the target charge unit 104. The adjusting unit 105 then outputs the adjusted result as a power command value PBSET of the battery system 2.

The wind-power generation power limiting unit 106 receives the operation mode of the operation command OPCOM, the power command values PBSET1 and PBSET, a dead zone value NFZMAX, the charge target command value PB1, and the charged ampere-hour WB from the power command value adjusting unit 105. If the change or fluctuation in the wind-power generation power exceeds the maximum output value PBMAX of the battery system 2 or if there exists a fear of overcharge of the battery 21, the power limiting unit 106 limits the output PW from the generator 1 using the output limitation value PWLIM.

Description will now be given in detail of the operation of the power command adjusting unit 105 and the wind-power generation power limiting unit 106.

Figure 4:
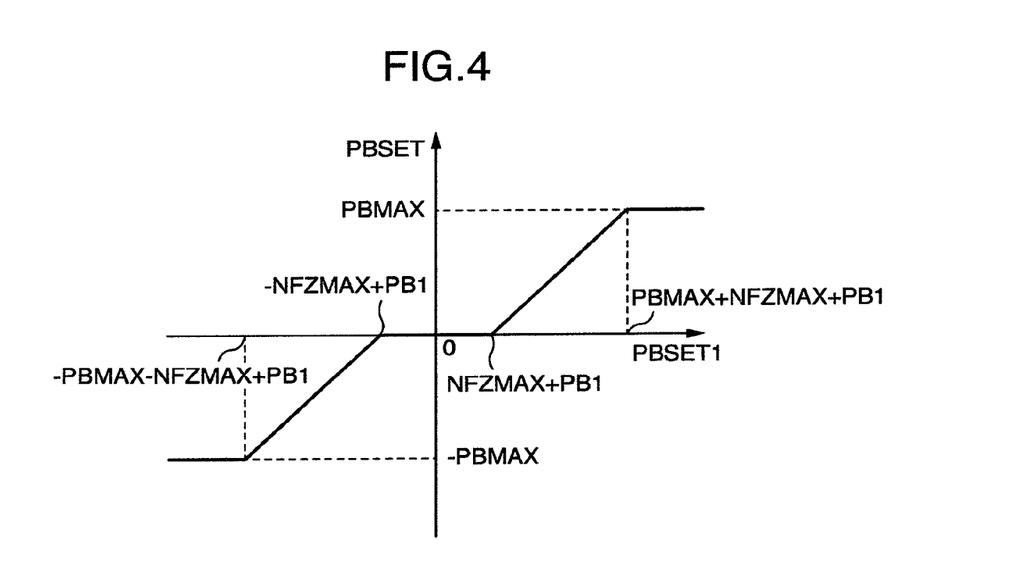
FIG. 4 is a graph showing a characteristic of a power command value adjusting unit in a regulation control operation.
Figure 5:
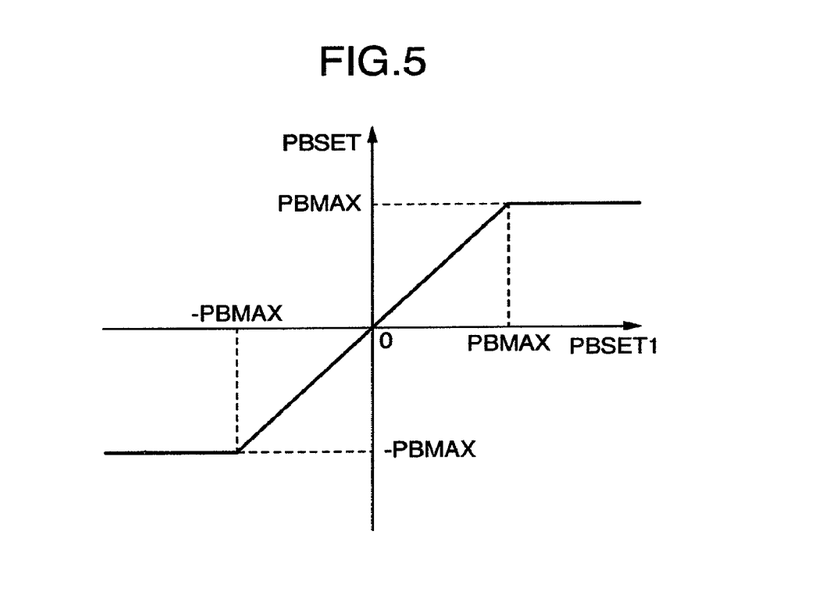
FIG. 5 is a graph showing a characteristic of the power command value adjusting unit in an output constant operation.

FIGS. 4 and 5 are graphs showing characteristics of the adjusting unit 105 in the regulation control operation and the output constant operation. The abscissa represents the power command value PBSET1 as an input and the ordinate represents the power command value PBSET as an output.

In the regulation control operation shown in FIG. 4, there is disposed a dead zone ranging from −NZFMAX to NZFMAX in which NZFMAX is set to keep the system output PS described for FIG. 2 within the variation control range. For example, if the variation control range is represented as ±5% of the rated value of the wind-power generator, NFZMAX is set to a value within a range of ±4% in consideration of the trace fluctuation of ±1% due to, for example, control delay of the battery system 2.

A gradient between the maximum output value PBMAX of the battery system 2 and the dead zone setting value NZFMAX and a gradient between −PBMAX and −NZFMAX are set to be one (1), respectively. That is, according to the setting, the change in this zone can be controlled solely by the battery system 2.

The charge target command value PB1 from the target charge unit 104 is assumed to be a value corresponding to a negative fluctuation if the charged ampere-hour WB is less than the charge target value WBTRG and a value corresponding to a positive fluctuation if the charged ampere-hour WB is more than the charge target value WBTRG. That is, by causing parallel displacement of the characteristic toward the left in the charge operation and toward the right in the discharge operation, the power command value PBSET of the battery system 2 is adjusted such that the charged ampere-hour WB is kept set to the charge target value WBTRG.

In the constant output operation shown in FIG. 5, since the battery system 2 is controlled to set the system output PS to the constant output value PSCNS, there does not exist the dead zone when compared with the situation in the regulation control operation shown in FIG. 4. Moreover, it is not possible to control the charged ampere-hour of the battery 21. There is hence employed a static limiter characteristic in which the output from the battery system 2 is controlled by the maximum output value PBMAX and the value of −PBMAX.

Figure 6:
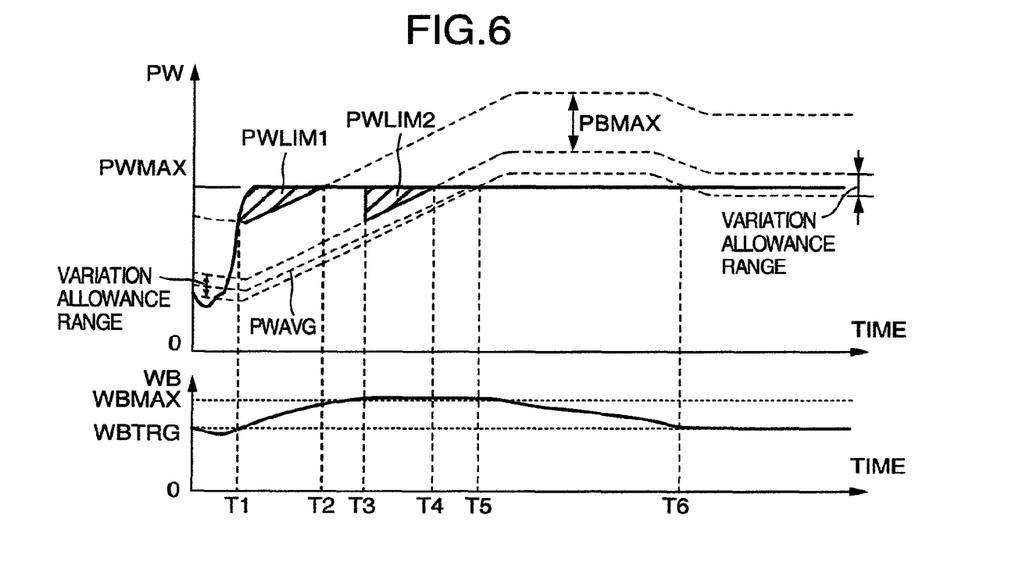
FIG. 6 is a graph showing an operation of a wind-power generation output limiting unit in a regulation control operation.
Figure 7:
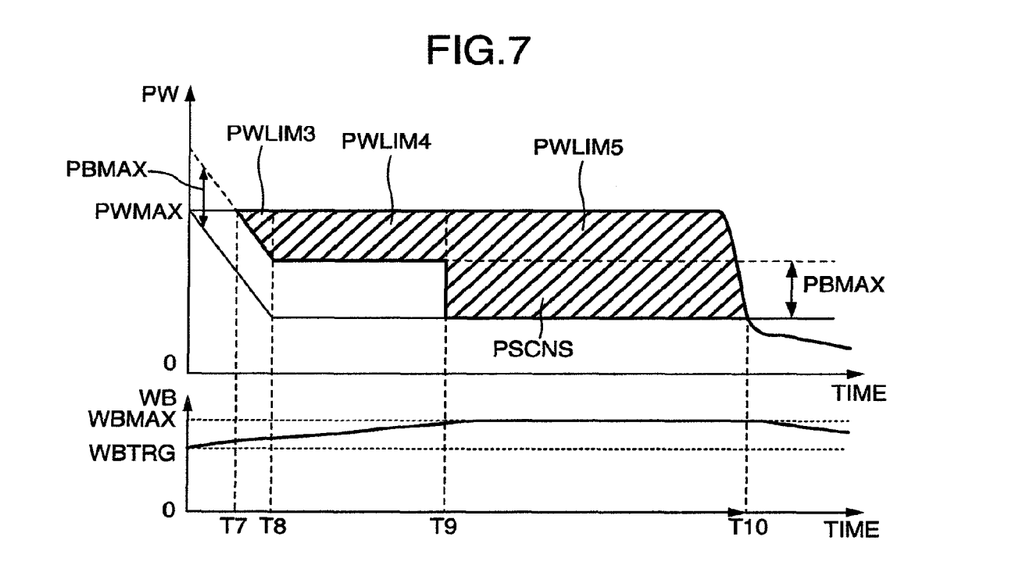
FIG. 7 is a graph showing an operation of the wind-power generation output limiting unit in an output constant operation.

FIGS. 6 and 7 are graphs to explain the operations of the wind-power generation power limiting unit 106 in the regulation control operation and the output constant operation. The abscissa represents time and the ordinate in the upper part represents the output PW from the wind-power generator 1 and the ordinate in the lower part represents the charged ampere-hour WB of the battery 21. That is, a solid line in the upper graph indicates a change in time of the output PW from the generator 1 and a solid line in the lower graph indicates the charged ampere-hour WB of the battery 21.

FIG. 6 shows the operation in which the wind speed abruptly increases during the regulation control operation and the output power PW of the generator 1 rapidly changes from a low value to the maximum value PWMAX. In this situation, the power limiting unit 106 limits the output PW of the generator 1 in the hatched section of FIG. 6 using the output command value PWLIM.

From time T1 to time T2, the change (PW−average value PWAVG−dead zone NFZMAX−charge target command value PB1) in the output PW from the generator 1 exceeds the maximum output value PBMAX of the battery energy storage system 2. Consequently, in this period of time, the output PW from the generator 1 is limited using the output command value PWLIM1.

During the period of time, the system output PS is a value obtained by subtracting the output limitation value PWLIM1 and the charge capacity of the battery system 2 from the output PW of the generator 1, the value being within the variation allowable range.

Also, during the period of time, since the charge target command value PB1 is gradually adjusted, the battery system 2 is charged according to the maximum output value PBMAX and the charged ampere-hour WB of the battery exceeds the charge target value WBTRG (e.g., 60% of the maximum charged ampere-hour of the battery).

From time T2 to time T3, the change in the output PW from the generator 1 is equal to or less than the maximum output value PBMAX. During this period, the output limit of the generator 1 is released. Since the output PW from the generator 1 is beyond the variation allowable range, the battery energy storage system 2 continues the charge operation to set the system output PS to a value within the variation allowable range. Therefore, the charged ampere-hour WB increases.

From time T3 to time T4, the output PW from the generator 1 is controlled according to an output limitation value PWLIM2 to prevent the battery energy storage system 2 from conducting the charge operation if the charged ampere-hour WB of the battery exceeds the maximum charged ampere-hour value WBMAWX (e.g., 90% of the maximum charged ampere-hour of the battery).

That is, by limiting the output PW from the generator 1 exceeding the variation allowable range using the output limitation value PWLIM2, the system output PS is set to a value within the variation allowable range.

From time T4 to time T5, the output PW from the generator 1 is within the variation allowable range, and the output limit of the generator 1 is released and the battery energy storage system 2 does not conduct the charge operation. Therefore, the charged ampere-hour WB is kept unchanged.

From time T5 to time T6, the battery system 2 conducts the discharge operation to adjust the charged ampere-hour WB to the target value WBTRG. After time T6, since the charged ampere-hour WB has reached the target value WBTRG, the charge target command value PB1 is set to zero and the discharge of the battery system 2 is kept released.

FIG. 7 shows the operation in which a transition occurs to the output constant operation (the constant output value PSCNS) when the output PW from the generator 1 is the maximum value PWMAX. In this situation, the wind-power generation power limiting unit 106 limits the output PW from the generator 1 using the output limitation value PWLIM.

During a period of time up to time T8, the system output command value PSTRG is changed from the average value PWAVG to the constant output value PSCNC. From time T7 to time T8, the output PW from the generator 1 which possibly changes from the system output target value to exceed the maximum output value PBMAX of the battery system 2 is limited using an output limitation value PWLIM3.

From time T8 to time T9, the system output PS is going to be the constant output value PSCNS. Since the change of the output PW from the generator 1 relative to the constant output value PSCNS exceeds the maximum output value PBMAX of the battery system 2, the excessive power is limited using an output limitation value PWLIM4 of the generator 1. During this period of time, the battery system 2 conducts the charge operation with the maximum output value PBMAX, and hence the charged ampere-hour WB rapidly increases.

From time T9 to time T10, to prevent the charge operation of the battery system 2 when the charged ampere-hour WB exceeds the maximum charge value WBMAX, the output PW from the generator 1 is limited using an output limitation value PWLIM5 to set the system output to the constant output value PSCNS.

After time T10, the output PW from the generator 1 is less than the constant output value PSCNS, and the battery system 2 conducts the discharge operation, and hence the charged ampere-hour WB is decreasing.

Figure 8:
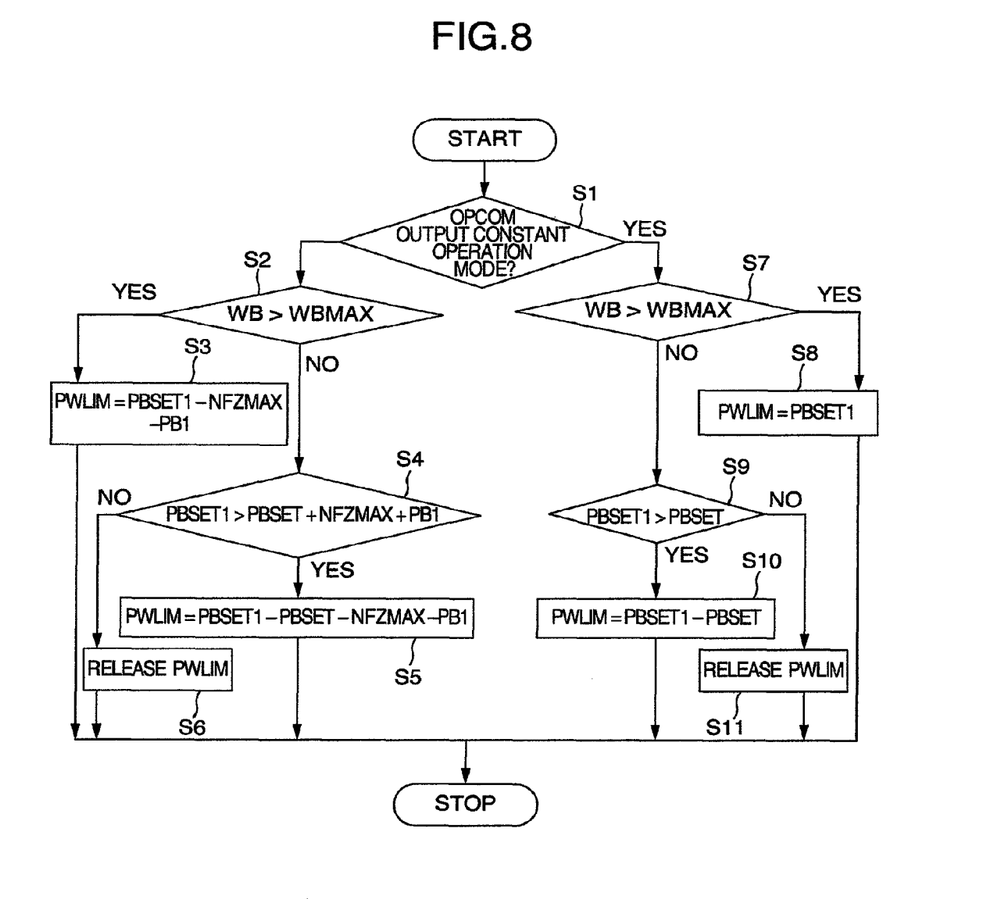
FIG. 8 is a flowchart showing a processing procedure of the wind-power generation output limiting unit.

Referring now to the flowchart of FIG. 8, description will be given of a processing procedure of the power limiting unit 106. In step S1, a check is made to determine on the basis of the operation command OPCOM whether the operation mode is the output constant operation mode or the regulation control operation mode.

In the case of the regulation control operation mode (no), control goes to step S2 to make a check to determine whether or not the charged ampere-hour WB of the battery 21 exceeds the maximum charge capacity value WBMAX. If this is the case (yes), control goes to step 3 to conducts an operation in which a value obtained by subtracting the dead zone value NFZMAX and the charge target command value PB1 from the power command value PBSET1 of the battery system 2 is set as the output limitation value PWLIM of the generator 1. Otherwise (no), control goes to step S4.

In step S4, a check is made to determine whether or not the power command value PBSET1 is more than a value obtained by adding the dead zone value NFZMAX and the charge target command value PB1 to the charge target command value PBSET, namely, whether or not the change in the output PW from the generator 1 exceeds the maximum output value PBMAX of the battery system. If this is the case (yes), control goes to step S5 to conduct an operation in which a value obtained by subtracting the power command value PBSET, the dead zone value NFZMAX, and the charge target command value PB1 from the power command value PBSET1 of the battery system 2 is set to the output limitation value PWLIM of the generator 1. That is, in the operation, a portion of the change in the output PW from the generator 1 exceeding the output limitation value PWLIM of the generator 1 is set to the output limitation value PWLIM of the generator 1. Otherwise (no), control goes to step S6 to release the output limitation value PWLIM.

Description has been given of the processing procedure of the power limiting unit 106 in the regulation control operation.

Next, description will be given of the processing procedure of the power limiting unit 106 in the output constant operation. In step S1, if the operation is in the output constant operation (yes), control goes to step S7 to determine whether or not the charged ampere-hour WB of the battery 21 exceeds the maximum charge capacity value WBMAX. If this is the case (yes), control goes to step S8 to conduct an operation in which the power command value PBSET1 of the battery system 2 is set as the output limit value PWLIM of the generator 1. Otherwise (no), control goes to step S9.

In step S9, a check is made to determine whether or not the power command value PBSET1 is more than the power command value PBSET, namely, whether or not the change in the output PW of the generator 1 exceeds the maximum output value PBMAX of the battery system. If this is the case (yes), control goes to step S10 to conduct an operation in which a value obtained by subtracting the power command value PBSET from the power command value PBSET1 of the battery system 2 is set as the output limitation value PWLIM of the generator 1. That is, a portion of the change in the output PW of the generator 1 exceeding the maximum output value PBMAX of the battery system is set as the output limitation value PWLIM of the generator 1. Otherwise (no), control goes to step S11 to release the output limitation value PWLIM.

Second Embodiment

In conjunction with the second embodiment, description will be given of operation of the power limiting unit 106 other than the operation conducted in the first embodiment. It is assumed that the configurations respectively of the first and second embodiments are similar to each other excepting the power limiting unit 106.

Figure 9:
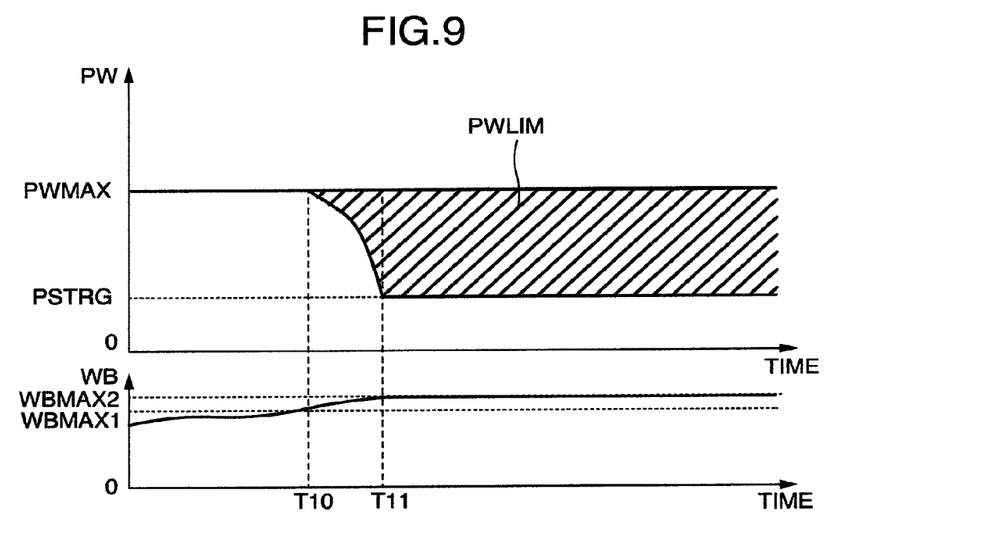
FIG. 9 is a graph to explain an operation of the wind-power generation output limiting unit in a second embodiment.

The operation of the power limiting unit 106 will be described by referring to FIG. 9. The graph of FIG. 9 shows the operation in which the output PW from the generator 1 is controlled using the output limitation value PWLIM during the output constant or regulation control operation when the output PW from the generator 1 the maximum value PWMAX.

At time T10, when the charged ampere-hour WB reaches a first maximum charge capacity value WBMAX1, an operation to limit the power PW of the generator 1 is started. At time T11, the output from the battery system 2 is zero due to the wind-power output limiting operation, and hence the charged ampere-hour WB is kept set to a second maximum charge capacity value WBMAX2. In this manner, if the charge capacity of the battery in the battery system 2 exceeds the predetermined value, the output limitation value of the generator 1 is set according to the increase in the charge capacity. It is also possible to change the output limitation value of the generator 1 such that the difference between the output PW and the system output command value PSTRG gradually becomes smaller.

Although the output limitation value of the generator 1 described above is a minimum value satisfying the operation condition, the output limitation value may be increased to include a margin within a range satisfying the operation condition.

In a method in which the output limiting operation of the generator is first started when the charged ampere-hour of the battery system 2 is full in a situation in which the excessive power portion is large in the full charge state, it is required to rapidly suppress the excessive power portion of the large capacity. There hence exists a fear that the suppression control is too late.

However, in the method as described for the second embodiment, when the charged ampere-hour of the battery system 2 is less than the maximum or full charge capacity, for example, about 95% of the maximum charge capacity, the output limiting operation of the wind-power generator 1 is started to fully suppress the excessive output power portion of the generator 1. It is therefore not required to suppress the power output of large capacity at a high speed, and hence the control to suppress the excessive portion of the output power can be more securely carried out.

According to the present invention, there is provided a system and a power controller capable of suppressing the change in the output power of the power source. The present invention is hence applicable to, in addition to a hybrid system using wind power and a battery, a system constructed by combining a battery energy storage system with a power source or a power generator having variable output power due to difficulty in control of input energy, for example, a power generator such as a photovoltaic power generator using natural energy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind-power generation system, comprising:
   a wind-power generator connected to a power system;
   a battery energy storage system electrically connected between the wind-power generator and the power system;
   a system controller for controlling charge and discharge of the battery energy storage system and for thereby adjusting output power to the power system;
   a control mode in which a target value of the output power to the power system is kept set to a fixed value for a predetermined period of time; and
   a calculation unit for calculating the fixed value according to a charged ampere-hour of the battery energy storage system and the predetermined period of time.

2. A wind-power generation system according to claim 1, wherein the calculation unit sets the fixed value in a range in which the battery energy storage system is capable of continuously conducts the discharge for the predetermined period of time.

3. A wind-power generation system according to claim 1, wherein the calculation unit sets the fixed value to a value equal to or less than a maximum output value of the battery energy storage system.

4. A wind-power generation system according to claim 1, wherein in an operation to conduct a switching operation between the control mode and a second control mode, the system controller adjusts the target value of the output power to the power system such that a rate of change in the output power is equal to or less than a predetermined value.

5. A wind-power generation system according to claim 4, further comprising a charge capacity controller for controlling, in the second control mode, the charged ampere-hour of the battery energy storage system to approach a predetermined value.

6. A wind-power generation system according to claim 1, further comprising an output suppressing unit for suppressing a portion of the change in the output power of the wind-power generator, the portion exceeding the maximum output value and the charge capacity of the battery energy storage system.

7. A hybrid system, comprising:
   a wind-power generator;
   a battery energy storage system for suppressing a change in output power of the wind-power generator to supply the power after suppression of the change to a power system:
   a control switching unit for conducting a switching operation between a first control mode in which the change in the output power of the wind-power generator is set to a value equal to or less than a predetermined value and a second control mode in which a control target value of the power to be supplied to the power system is set to a fixed value;
   a fixed value setting unit for setting the fixed value of the second control mode according to a charged ampere-hour of the battery energy storage system and the predetermined period of time; and
   an output suppressing unit for suppressing, in the second control mode, a portion of a change relative to the fixed value of the output power of the wind-power generator, the portion of the power exceeding an empty charge capacity and a maximum charge capacity per unitary time of the battery energy storage system.

8. A hybrid system according to claim 7, wherein the fixed value setting unit sets the fixed value such that the battery energy storage system is not set to an insufficiently energized state within a predetermined period of time and the fixed value is equal to or less than a maximum output value per unitary time of the battery energy storage system.

9. A hybrid system according to claim 7, wherein in an operation to conduct a switching operation between the first control mode and the second control mode, the target value of the output power to the power system is adjusted such that a rate of change with respect to time of the output power is within a predetermined range.

10. A hybrid system according to claim 7, wherein the output suppressing unit suppresses, in the first control mode, a portion of a change in the output power of the wind-power generator, the portion of the power exceeding an empty charge capacity and a maximum charge capacity per unitary time of the battery energy storage system.

11. A hybrid system according to claim 10, wherein the output suppressing unit adjusts an output suppressing value of the wind-power generator according to the charged ampere-hour of the battery energy storage system.

12. A hybrid system according to claim 7, further comprising a charge capacity securing unit for securing a predetermined charged ampere-hour of the battery energy storage system, wherein the charge capacity securing unit operates in the first control mode.

13. A power controller for controlling output power, which is to be supplied to a power system, of a battery energy storage system electrically connected a generator coupled with a shaft of a windmill, the power controller comprising:

a control mode in which a target value of the power to be supplied to the power system is kept set to a fixed value for a predetermined period of time; and a calculation unit for calculating the fixed value according to a charged ampere-hour of the battery energy storage system and the predetermined period of time.

14. A power controller according to claim 13, wherein the fixed value setting unit sets the fixed value such that the battery energy storage system is not set to an insufficiently energized state within the predetermined period of time, the fixed value being equal to or less than a maximum output value of the battery energy storage system.

15. A power controller according to claim 13, further comprising an output suppressing unit for suppressing the output power of the generator if the output power of the generator is more than the fixed value in the control mode and if a difference between the output power of the generator and the fixed value exceeds a maximum charge value of the battery energy storage system or the battery energy storage system is in a full charge state.

16. A power controller according to claim 15, wherein the output suppressing unit comprises either one of a pitch angle control unit for adjusting a pitch angle of the windmill, a converter controller for controlling operation of a power converter electrically connected to the generator, and a combination of the pitch angle control unit and the converter controller.

* * * * *